United States Patent
Lennen

(10) Patent No.: US 8,970,431 B2
(45) Date of Patent: *Mar. 3, 2015

(54) METHOD AND APPARATUS FOR WEAK DATA BIT SYNC IN A POSITIONING SYSTEM

(75) Inventor: Gary Lennen, Cupertino, CA (US)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,077

(22) Filed: May 22, 2012

(65) Prior Publication Data

US 2012/0299771 A1    Nov. 29, 2012

Related U.S. Application Data

(63) Continuation of application No. 12/276,987, filed on Nov. 24, 2008, now Pat. No. 8,184,047.

(51) Int. Cl.
*G01S 19/32* (2010.01)
*G01S 19/24* (2010.01)
*G01S 19/25* (2010.01)
*G01S 19/23* (2010.01)

(52) U.S. Cl.
CPC .............. *G01S 19/24* (2013.01); *G01S 19/258* (2013.01); *G01S 19/23* (2013.01); *G01S 19/235* (2013.01)
USPC .................................................. 342/357.62

(58) Field of Classification Search
CPC ...... G01S 19/23; G01S 19/235; G01S 19/258
USPC ........................................ 342/357.12, 357.62
See application file for complete search history.

(56) References Cited

U.S. PATENT DOCUMENTS

| | | | | |
|---|---|---|---|---|
| 5,446,465 A | * | 8/1995 | Diefes et al. | 342/357.34 |
| 5,459,763 A | * | 10/1995 | Hori et al. | 375/354 |
| 6,108,317 A | * | 8/2000 | Jones et al. | 370/320 |
| 6,292,748 B1 | | 9/2001 | Harrison | |
| 6,295,023 B1 | | 9/2001 | Bloebaum et al. | |
| 6,298,073 B1 | | 10/2001 | LeFever | |
| 6,396,953 B1 | | 5/2002 | Abbey | |
| 6,532,251 B1 | * | 3/2003 | King et al. | 375/142 |
| 6,643,788 B1 | | 11/2003 | Butler et al. | |
| 6,763,241 B2 | | 7/2004 | Gous et al. | |
| 6,771,615 B1 | | 8/2004 | Park et al. | |
| 6,934,322 B2 | | 8/2005 | King et al. | |
| 7,006,790 B2 | | 2/2006 | Bloebaum et al. | |
| 7,064,709 B1 | | 6/2006 | Weisenburger et al. | |

(Continued)

FOREIGN PATENT DOCUMENTS

| | | |
|---|---|---|
| CN | 1419654 | 5/2003 |
| CN | 1543715 | 11/2004 |

(Continued)

*Primary Examiner* — Frank J McGue
(74) *Attorney, Agent, or Firm* — Pillsbury Winthrop Shaw Pittman LLP

(57) ABSTRACT

The present invention is related to location positioning systems, and more particularly, to a method and apparatus of synchronizing to data bits in a positioning system signal. According to a first aspect, the present invention speeds up data bit sync by allowing high Pfa in the overall bit sync computation (e.g. $10^{-2}$) for coarse aided case. According to another aspect, the present invention combines and aligns signals from satellites for use in the bit sync computation (e.g. for improved sensitivity and speed).

22 Claims, 6 Drawing Sheets

(56) References Cited

U.S. PATENT DOCUMENTS

| | | |
|---|---|---|
| 7,408,504 B2 | 8/2008 | Kishimoto et al. |
| 7,924,220 B1* | 4/2011 | Lennen et al. ............ 342/357.31 |
| 8,031,113 B2* | 10/2011 | Gaal et al. ................. 342/357.64 |
| 2001/0014115 A1* | 8/2001 | Kumura ........................ 375/148 |
| 2002/0037732 A1 | 3/2002 | Gous et al. |
| 2002/0183070 A1 | 12/2002 | Bloebaum et al. |
| 2005/0031045 A1 | 2/2005 | Mayor et al. |
| 2005/0116860 A1 | 6/2005 | Kishimoto |
| 2005/0212698 A1 | 9/2005 | Barron et al. |
| 2007/0058699 A1 | 3/2007 | Chen et al. |
| 2007/0076788 A1* | 4/2007 | Jia et al. ........................ 375/150 |
| 2008/0002797 A1* | 1/2008 | Raman et al. ................. 375/355 |
| 2008/0013605 A1 | 1/2008 | Lin |
| 2008/0303713 A1 | 12/2008 | Han |
| 2009/0021427 A1 | 1/2009 | Tsai |
| 2011/0193742 A1 | 8/2011 | Lennen et al. |

FOREIGN PATENT DOCUMENTS

| | | |
|---|---|---|
| WO | WO 01/53849 | 7/2001 |
| WO | WO 03/017518 | 2/2003 |
| WO | WO2004/097445 | * 11/2004 |
| WO | WO 2009/108915 | 3/2009 |

* cited by examiner

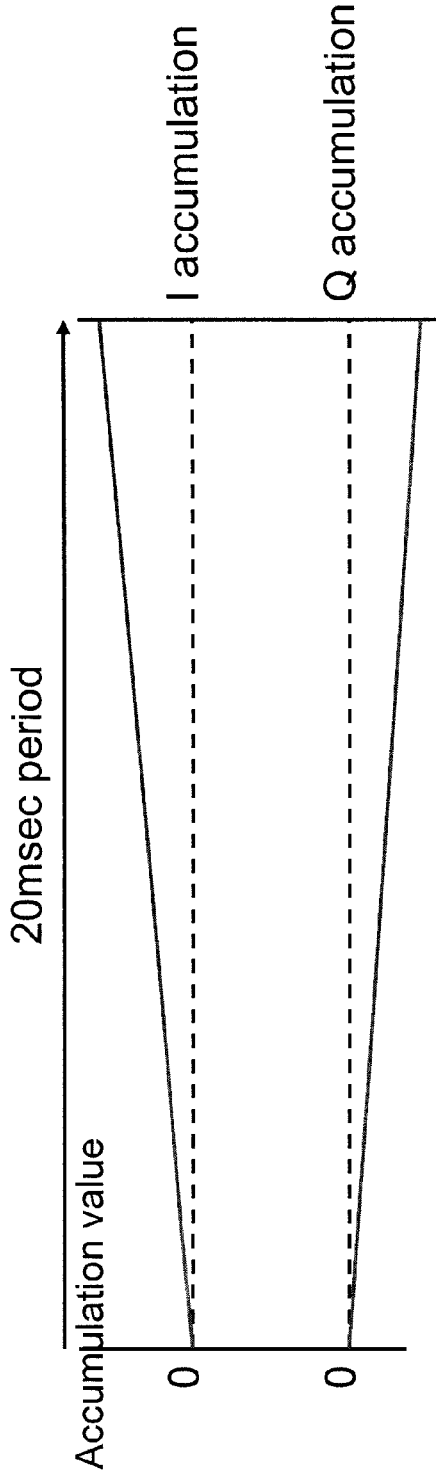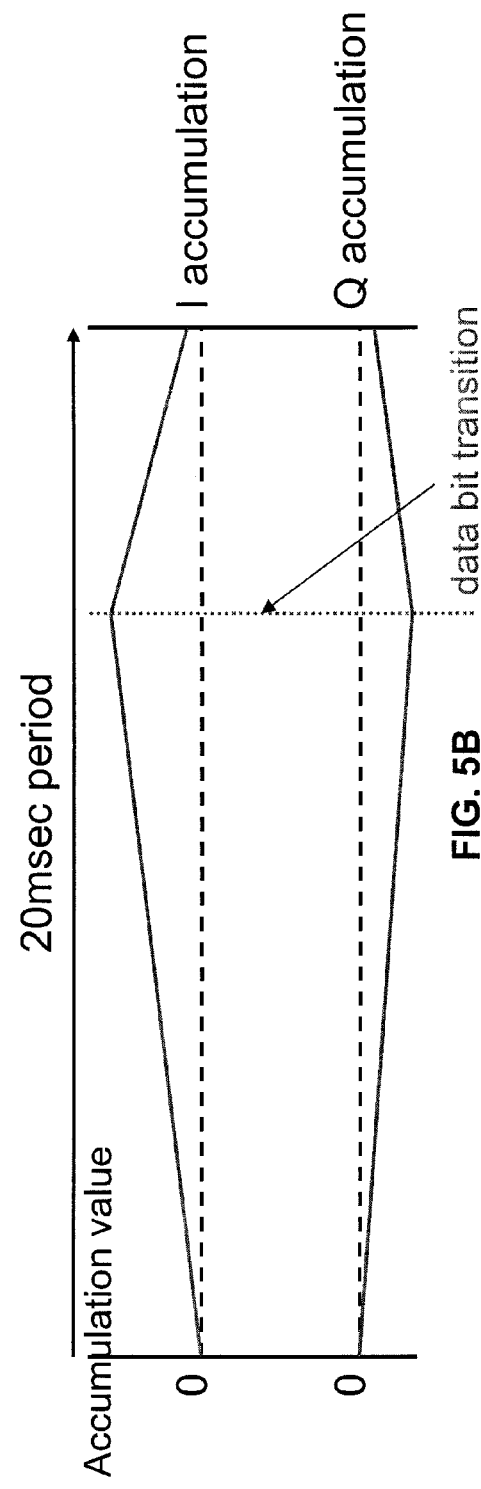

METHOD AND APPARATUS FOR WEAK DATA BIT SYNC IN A POSITIONING SYSTEM

CROSS-REFERENCE TO RELATED APPLICATIONS

The present application is a continuation of U.S. patent application Ser. No. 12/276,987 filed Nov. 24, 2008, now U.S. Pat. No. 8,184,047, the contents of which are incorporated herein in their entirety.

FIELD OF THE INVENTION

The present invention is related to location positioning systems, and more particularly, to a method and apparatus of synchronizing to data bits in a satellite positioning system signal such as a GPS signal.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver typically has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

The signals from the navigational satellites are modulated with navigational data at 50 bits/second (i.e. 1 bit/20 msec). This navigational data consists of ephemeris, almanac, time information, clock and other correction coefficients. This data stream is formatted as sub-frames, frames and super-frames. A sub-frame consists of 300 bits of data and is thus transmitted over 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames. The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4. The almanacs and ephemeris are used in the computation of the position of the satellites at a given time.

Accordingly, it is clear from the foregoing that the process of locking onto and synchronizing to signals from positioning system satellites, and particularly to being able to extracting meaningful data from such signals, is an important process before determining position and navigating using such signals can begin.

Because conventional synchronization schemes were sometimes time-consuming, an approach called "Sync Free Nav" has sometimes been used. However, this approach typically requires acquiring and tracking signals from five satellites, which is not always possible. Moreover, using sync free nav sometimes leads to a decrease in initial position performance because sync free nav can have a time offset that leads to position error due to satellite motion.

Accordingly, a method and apparatus for quickly and effectively synchronizing to signals from positioning system satellites remains desirable, whether or not sync free nav is also used.

SUMMARY OF THE INVENTION

The present invention is related to location positioning systems, and more particularly, to a method and apparatus of synchronizing to data bits in a positioning system signal. According to a first aspect, the present invention speeds up data bit sync by allowing high Pfa in the overall bit sync computation (e.g. $10^{-2}$) for coarse aided case. According to another aspect, the present invention combines and aligns signals from satellites for use in the bit sync computation (e.g. for improved sensitivity and speed).

In furtherance of these and other aspects, an exemplary method for synchronizing to one or more signals in a positioning system includes accumulating respective first power values at a plurality of time offsets for a first one of the signals, accumulating respective second power values at the plurality of time offsets for a second one of the signals, time aligning the first and second signals, combining the accumulated first and second power values at the plurality of time offsets after time alignment, identifying a peak combined power value at one of the plurality of time offsets, and determining whether the peak combined power value corresponds to successful synchronization.

In additional furtherance of the above and other aspects, another exemplary method for synchronizing to one or more signals in a positioning system includes accumulating respective first power values at a plurality of time offsets for a first one of the signals, identifying a first peak power value at one of the plurality of time offsets, and determining whether the first peak power value corresponds to successful synchronization of the first signal, accumulating respective second power values at the plurality of time offsets for a second one of the signals, time aligning the first and second signals, combining the accumulated first and second power values at the plurality of time offsets after time alignment, identifying a peak combined power value at one of the plurality of time offsets, and determining whether the peak combined power value corresponds to successful synchronization of the combined signals, wherein a threshold for success of the combined signals is lower than a threshold for success of the first signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 5A and 5B illustrate accumulated I and Q values over a 20 msec interval with bit alignment and without bit alignment, respectively.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
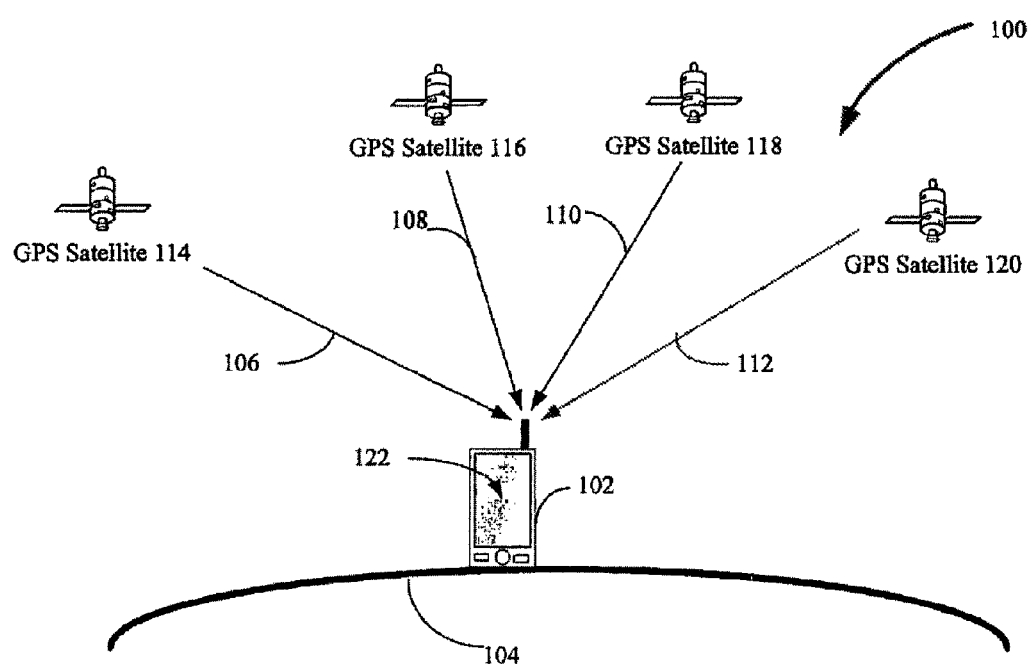
FIG. 1 is a block diagram of an example implementation of principles of the invention.

FIG. 1 illustrates an example implementation of embodiments of the invention. As shown in FIG. 1, in a GPS system 100, GPS satellites (i.e. SVs) 114, 116, 118 and 120 broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cell or other type of telephone with built-in GPS functionality, or any GPS device embedded in tracking applications (e.g. automotive tracking from Trimble, package or fleet management tracking from FedEx, child locator tracking applications etc).

Receiver 122 can be implemented using any combination of hardware and/or software, including GPS chipsets such as SiRFstarIII GSD3tw or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the data bit synchronization techniques of the present invention after being taught by the present specification.

Signals 106, 108, 110 and 112 are well-known GPS signals in which three binary codes shift the satellite's transmitted L1 and/or L2 frequency carrier phase. Of particular interest, the C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each SV. GPS satellites are often identified by their PRN number, the unique identifier for each pseudo-random-noise code. The C/A code that modulates the L1 carrier is the basis for the civil uses of GPS.

Receiver 122 produces the C/A code sequence for a specific SV with some form of a C/A code generator. Modem receivers usually store a complete set of pre-computed C/A code chips in memory, but a hardware shift register implementation can also be used. The C/A code generator produces a different 1023 chip sequence for each phase tap setting. In a shift register implementation the code chips are shifted in time by slewing the clock that controls the shift registers. In a memory lookup scheme the required code chips are retrieved from memory. The C/A code generator repeats the same 1023-chip PRN-code sequence every millisecond. PRN codes are defined for up to 1023 satellite identification numbers (37 are defined for satellite constellation use in the ICD but system modernization may use more). The receiver slides a replica of the code in time until there is correlation with the SV code.

Figure 2:
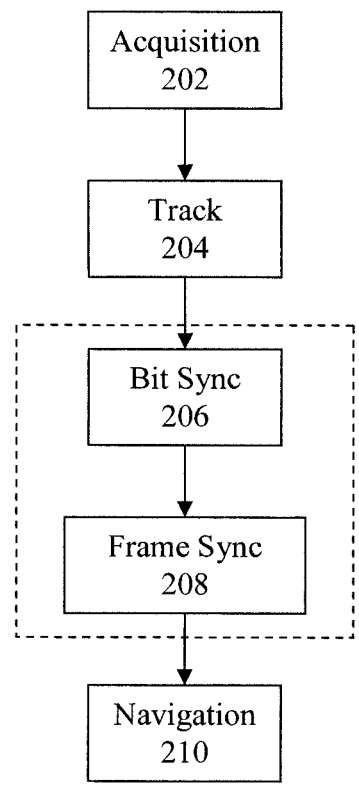
FIG. 2 is a block diagram of a typical receiver sequence in which the present invention can be included.

As is known, signals from at least four SVs are needed before receiver 122 can provide a 3-dimensional navigation solution (only three satellites are required for a 2-dimensional navigation solution, e.g. by using known height). Accordingly, as shown in FIG. 2, receiver 122 typically enters a predetermined sequence to acquire and extract the required data from each of signals 106, 108, 110 and 112. In a first step, acquisition 202, receiver 122 acquires signals 106, 108, 110 and 112 by correlating the unique C/A code corresponding to SVs 114, 116, 118 and 120 with received RF energy at the antenna of handset 102 and determining that these received signals have sufficient strength (e.g. carrier to noise ratio C/N0) to use in subsequent processing. In a next step, track 204, the receiver 112 locks onto the C/A code for each acquired SV, which repeats every 1 msec. In step 206, receiver 112 synchronizes to the data bit in each signal 106, 108, 110 and 112, which occurs once over 20 msec. Then in step 208, receiver 112 determines the frame boundary of the received bits in signals 106, 108, 110 and 112. At this point in step 210 navigation can begin, for example by trilateration techniques known to those skilled in the art.

It should be noted from FIG. 2 that frame synchronization step 208 is omitted (and sometimes also step 206) in some applications such as sync free nav (although bit synchronization 206 is still desired for optimal operation as tracking loops need to integrate across an exact data bit to maximize signal energy applied to tracking). Nevertheless, by improving bit synchronization 206 using the present disclosure the overall process for obtaining a position solution is both sped up and made more signal sensitive in all types of applications, regardless of whether sync free nav is used. Moreover, while the present disclosure is related to embodiments of determining data bit synchronization 206, other conventional and novel techniques can be performed to perform acquisition 202, track 204, frame synchronization 208 (see, e.g., U.S. patent application Ser. No. 12/277,044 filed Nov. 24, 2008, now U.S. Pat. No. 7,924,220, incorporated by reference herein) and navigation 210, but details thereof will be omitted here for sake of clarity of the invention.

With reference to FIG. 2, after track has been achieved, the receiver tries to synchronize to the data bits in the signals from each SV. More particularly, after track 204, the receiver is locked to the C/A code for each SV, which repeats every 1 msec. However, since the data bit only occurs every 20 msec, the receiver still needs to resolve in what 1 msec interval the data bit occurs and set the receiver time accurately.

A conventional data bit sync process processes each SV being tracked separately and uses a sample (e.g. from 5 to up to 200) of received bits. The success of the algorithm depends on the actual number of bit transitions in the sample—i.e., the probability that adjacent bits will have opposite polarity. In the long term this probability has been observed to be about 50%. That is, about 50% of the time, the next bit will have the same/different polarity as the current bit. However, in the relatively short samples being used, this long term average cannot be relied upon. The performance of the algorithm depends on the actual probability of bit transition in the sample. Note that the number of positive bits versus the number of negative bits is of no interest, only the bit transitions matter.

The algorithm sums 20 one-msec I and Q correlation values over the entire sample, then offsets the integration time by one msec and repeats the process, then offsets the integration by 2 msec, 3 msec, etc. up to 19 msec. At the end of this process, the magnitude $V_n$ of each 20 msec sum is obtained (n=0 to 19).

The process is repeated over successive 20 msec periods and the respective sums $V_n$ are accumulated until one of the sums $V_n$ satisfies a predetermined criterion compared to the others. More particularly, one of these sums, for example $V_0$, is guaranteed to have spanned exactly one bit period. The rest of them, $V_1$ through $V_{19}$, have been integrated over portions of two bit periods, and therefore the bit transitions are more likely to have canceled each other.

This aspect is illustrated in more detail in connection with FIGS. 5A and 5B. The integration across each 20 msec period for offsets 0 . . . 19 msecs is a coherent integration process (in both I and Q). For perfect msec alignment with the data bit edge a typical coherent process will see the magnitude of individual I and Q summations across the 20 msec period increase linearly as shown in FIG. 5A. Note that I and Q summations may increase positively or negatively depending on carrier phase relative to incoming satellite signal, this additive or subtractive summation effect is removed in the signal magnitude calculation performed at the end of the 20 msec period by the function sqrt($I^2+Q^2$). In the case of FIG. 5A, the magnitude will continue to increase through the end of the 20 msec interval, resulting in a peak value at the end of the interval.

In comparison, for an example that is not exactly bit aligned (i.e. a bit transition occurs within the 20 msec interval), the I and Q values will stop linearly increasing and start linearly decreasing, as shown in FIG. 5B. In comparison with FIG. 5A, therefore, the magnitude at the end of the 20 msec interval will be less than the maximum.

When the probability exceeds a certain threshold that one of these sums (i.e. $V_0$) corresponds to the 1 msec C/A offset location of the data bit, the process stops and data bit sync has been achieved. The probability can be expressed either as the probability of false alarm Pfa or the probability of decision Pd. A conventional measure of successful data bit sync is when Pfa<$10^{-4}$. After data bit synchronization is achieved for all SVs being tracked, frame synchronization can begin, and ultimately navigation can be performed.

One problem with the conventional data bit sync process described above is that it can take many seconds to achieve a Pfa of less than $10^{-4}$ for one or more SVs, especially in weak signal conditions (e.g. up to 8 seconds for carrier-to-noise ratio (CNO) conditions less than 20 dB-Hz). Meanwhile, some GPS applications (e.g. for use with GSM handsets) require a fast time-to-first-fix (i.e. TTFF) (see 3GPP standard for GSM handsets, for example). In this case the overall time sequence must be optimized and generally requires bit sync to occur in less than 2 seconds.

According to one aspect, the present invention speeds up the bit sync process by allowing higher Pfa in bit sync computation (e.g. $10^{-2}$) in cases where some a priori information on time and/or position is known (e.g. network aided or coarse aided cases). According to another aspect, the present invention combines satellites together in the bit sync computation (improved sensitivity and speed).

It should be noted that the present invention further speeds up the overall sequence shown in FIG. 2. Sync free nav primarily refers to skipping step frame sync (step 208). The invention described herein relates to speeding up the bit sync step 206, and as such it is capable of speeding up both sync free navigation ON or OFF cases. Practically speaking, the improved bit sync speed and sensitivity helps get back performance (both speed and sensitivity) when turning sync free nav off but it will also improve the sync free nav case. The present invention therefore can be used with sync free nav on, but can also be used to speed up the sync free nav off case.

It should be further noted that aspects of the present invention can generally be applied in any case where the unknown time offset between satellites is approximately less than half the modulo 1 millisecond uncertainty. This means that the time offset can be large (as supplied by network timing or receiver RTC, real-time clock) as long as the time offset is similar for all satellites. The second criteria is that the position be known to better than approximately 150 km (0.5 msecs at speed of light). For network aiding in GSM networks this position aiding is generally <30 km in error. The network aided case in GSM is generally referred to as coarse aided operation (because time is given via network to <2 seconds and position is <30 km in error).

Another important case where aspects of the invention can be applied is generally known as 'hot' starts. 'Hot' refers to the receiver having been on recently (example: within last 1 hour) but has been off and time is being maintained using the RTC circuit. When the power is turned on again the receiver already has some ephemeris data from last time it was ON (note: this is a case where there is no network aiding). Now the time has drifted due to the accuracy of the RTC and the position error is estimated based on an assumed motion model for the user (for example assume 50 m/sec maximum motion). The time accuracy offset is the same for all satellites and as long as the assumed position error model does not drift beyond approximately 0.5 msecs (150 km), the techniques described in this invention can be used. The techniques of the invention also apply to cases where more precise aiding information is available.

It should be still further noted that, according to some aspects, the techniques of the invention can overcome errors due to satellite motion, as occurs in some approaches such as sync free nav. More particularly, assume ephemeris information is known for each satellite being tracked (which is the case for coarse aided GSM and hot starts), as well as an approximate position fix (e.g. <30 km). Further assume the time offset is 2 seconds. The satellite's maximum motion with respect to the user is approximately 1 km/sec or 1 m/msec, hence if time is known within 2 seconds, then the satellite position is known within approximately 2 km error. When satellite position is used in a position fix the error gets multiplied by position dilution of precision (PDOP). PDOP is the satellite geometry impact on position fix accuracy. In a worst case all satellites are at the same point in space, and thus any errors in pseudo-ranges will result in infinite position fix errors because the equations are ill-defined. A PDOP of 3 is typical so the error due to time uncertainty on each satellite is approximately 3 m/msec. This time error is avoided by correctly bit syncing and frame syncing such that the time error between satellites is zero. The bit sync algorithm described in more detail herein forces the bit sync error to be the same between all satellites, by either assuming the first bit sync found is correct for all other satellites (assuming unwrapping of the known user to satellite distance, modulo 1 msec), or using multiple satellites to compute the bit sync. If the bit sync is wrong by 1 msec for all satellites then this becomes a constant receiver time offset in navigation equations and no navigation error arises.

Figure 3:
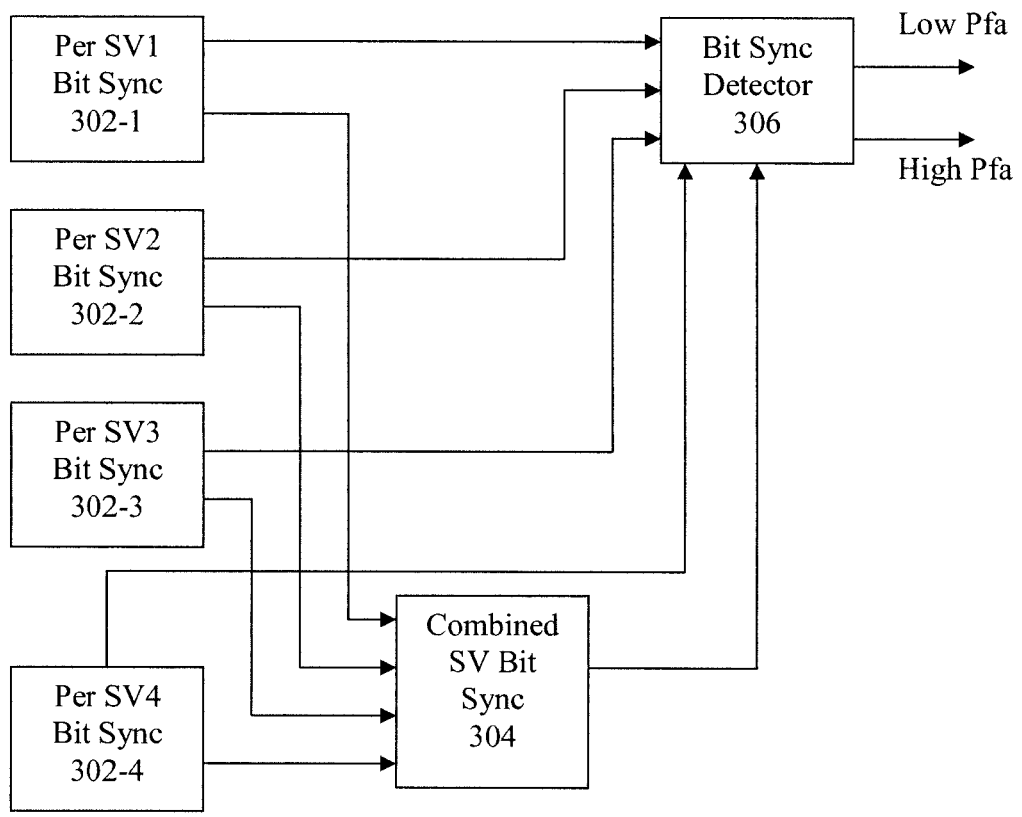
FIG. 3 is a block diagram of a weak data bit synchronizer according to aspects of the invention.

In general, as shown in FIG. 3, the weak data bit synchronizer 300 according to embodiments of the invention includes individual SV bit sync modules 302-1 to 302-4, a combined SV bit sync module 304, and a bit sync detector 306. In operation, data bit synchronizer 300 uses two different thresholds for Pfa. The individual SV bit sync modules 302-1 to 302-4 use a conventional high Pfa threshold, while the combined SV bit sync module 304 use a lower Pfa threshold. The detector 306 will detect when the weak bit sync triggers first, and the second bit sync threshold will continue to improve results but is not required for initial navigation.

In embodiments, the individual SV bit sync modules 302-1 to 302-4 run a bit sync algorithm as described above. Meanwhile, the combined bit sync module 304 adds the power sums across satellites for each of the 20×1 msec power summations. The multi-satellite power sums are then used to make bit sync decisions, with a lower Pfa threshold (e.g. $10^{-2}$). It should be noted that the lower threshold is not necessary, but that the multiple satellite combination can also be used to improve performance while maintaining a higher threshold, and so the invention should not be limited to this example.

In embodiments to be described in more detail below, the combined bit sync module 304 uses information from all SVs being tracked to perform combined bit sync computations. However, other embodiments are possible. For example, module 304 can use an optimal combining algorithm based on each satellite's CNO if they are not within a given threshold (e.g. about 3 dB of each other). For example, if two satellites have CNO=21 dB-Hz and two more have CNO=15 dB-Hz then the best combination is based on the two satellites at 21 dB-Hz, and the two at 15 dB-Hz would not be used in the multiple satellite combining bit sync algorithm. Other combinations are also possible. For example, a single high CNO satellite can be used to set bit sync for all satellites in the coarse aided case. In any event, module 304 forms combined bit sync power sums at all 20 possible msec offsets.

It should be noted that according to aspects of the invention, the bit synch algorithm herein can achieve synchronization with only four SVs as shown in FIG. 3, rather than five or more as is required in some other applications. However, this is not necessary, and the invention can also be practiced with additional SVs.

Figure 4:
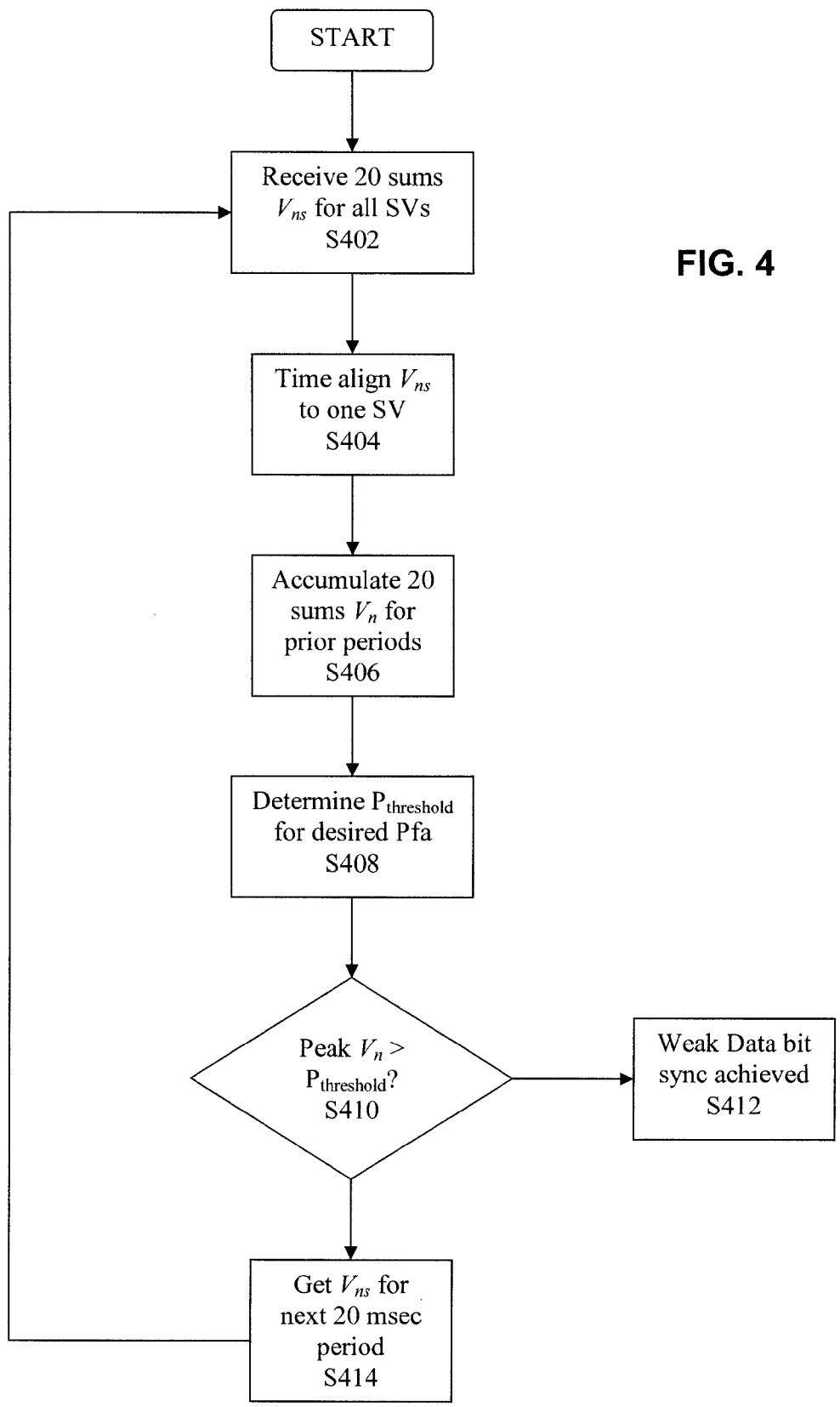
FIG. 4 is a flowchart illustrating an example combined bit sync methodology that can be performed in accordance with aspects of the invention.

An example detection method of combined SV bit sync module 304 is illustrated in FIG. 4.

Every 20 msec, each of the individual SV bit sync modules 302 (s=1, 2, 3, 4) provides a set of 20 1 msec sums $V_{ns}$ as follows:

$$I = \Sigma I_k (k=1 \ldots 20)$$

$$Q = \Sigma Q_k (k=1 \ldots 20)$$

$$V_{ns} = \sqrt{I^2 + Q^2}, (n=0 \ldots 19)$$

Module 304 receives a full set of sums $V_{ns}$ for a given 20 msec period from modules 302 in step S402.

In step S404, before summing the power sums together, module 304 aligns the power sums from the different satellites in time by adjusting for each satellite's signal transit time. The transit time is derived from the difference between the satellite's position (known via ephemeris information) and the user position (known from a coarse-aided system).

More particularly, the present invention recognizes, inter alia, that a coarse-aided system (e.g. GSM network-aided applications) provides user position (i.e. $X_u$, $Y_u$, $Z_u$) within about 30 km, and also provides ephemeris for all satellites (i.e. $X_s$, $Y_s$, $Z_s$). There is also a ±2 second time uncertainty, and so bit sync and frame sync are then required to resolve time to better than 1 msec in the non-sync free nav case. In this case, pseudo-range PR can be calculated for all satellites s being tracked as:

$$PR_s = \text{SQRT}((X_s-X_u)^2 + (Y_s-Y_u)^2 + (Z_s-Z_u)^2) \text{ where } s=1, 2, 3, 4$$

The transit time for each satellite signal is then easily obtained as $T_s = PR_s/c$, where c is the speed of light (about $3 \times 10^8$ m/sec, or about 300 km per 1 msec). It should be noted that ionospheric effects can be considered separately but are typically not large (<100 meters). Meanwhile, parameters such as Doppler relate to a change in relative position so they are taken into account as satellite position error because it has moved. The times for each satellite can then be readily aligned in milliseconds, for example from the first satellite SV1 as:

$$\Delta T_2 = (T_2 - T_1)/1 \text{ msec} + \text{remainder}_2$$

$$\Delta T_3 = (T_3 - T_1)/1 \text{ msec} + \text{remainder}_3$$

$$\Delta T_4 = (T_4 - T_1)/1 \text{ msec} + \text{remainder}_4$$

For purposes of aligning the power sums, only the 1 msec portions of the offset are considered and the remainders can be ignored.

It should be apparent that for a first iteration of step S404, that more than one set of sums $V_{ns}$ for each satellite may need to be obtained before alignment occurs for a first set 20 msec time period, due to the differences in transit times for each SV. After time aligning the power sums, the combined 1 msec sums $V_n$ for each respective n=0 . . . 19 can be found summing all the $V_{ns}$ from SVs (s=1 to 4) as:

$$V_n = \Sigma V_{ns}$$

In step S406, these new sums $V_n$ are respectively accumulated with any prior sums $V_n$ from prior 20 msec periods.

Similar to the conventional process, respective sums $V_n$ are accumulated over successive 20 msec periods until one of the sums $V_n$ satisfies a predetermined criterion compared to the others. More particularly as shown in step S408, the probability that of one of these sums, for example $V_0$, corresponds to the 1 msec C/A offset location of the data bit, is determined. Further similar to the conventional process, the probability can be expressed either as the probability of false alarm Pfa.

In embodiments, Pfa is determined in step S408 as a function of the difference between the respective 1 msec power sum (e.g. $V_0$) with the highest accumulated value, and the respective 1 msec power sum with the next highest accumulated value (e.g. $V_1$ or $V_{19}$). Although FIG. 4 shows step S408 being performed each iteration, it should be understood that this is not necessary in practice. For example, threshold values of the highest peak (e.g. $V_0$) or threshold ratios of the highest peak to the next highest peak can be derived from simulation (possibly in the presence of noise, frequency offsets, etc.). One example result of such simulations is a threshold $V_n$ value $P_{threshold}$, where $P_{threshold}$ is determined via simulation to give an acceptable Pd and Pfa, in this case Pfa<$10^{-2}$. Those skilled in the art will recognize various simulation methods and techniques that can be used to determine $P_{threshold}$ for any suitable application. Moreover, those skilled in the art will understand how to run the simulations similar to those in the conventional art, but select thresholds that result in a significantly weakened Pfa or a different threshold based on the improved signal energy available via multiple satellite combining as taught in the present specification.

In step S410, the peak accumulated combined power sum $V_n$ (e.g. $V_0$) is compared to a predetermined threshold, for example $P_{threshold}$, as described above. If the power value equals or exceeds the threshold, then weak data bit sync has been achieved as shown in step S412. This condition is reported to the bit sync detector 306, along with information regarding the determined location of the data bit in the 20 msec C/A code.

Figure 6:
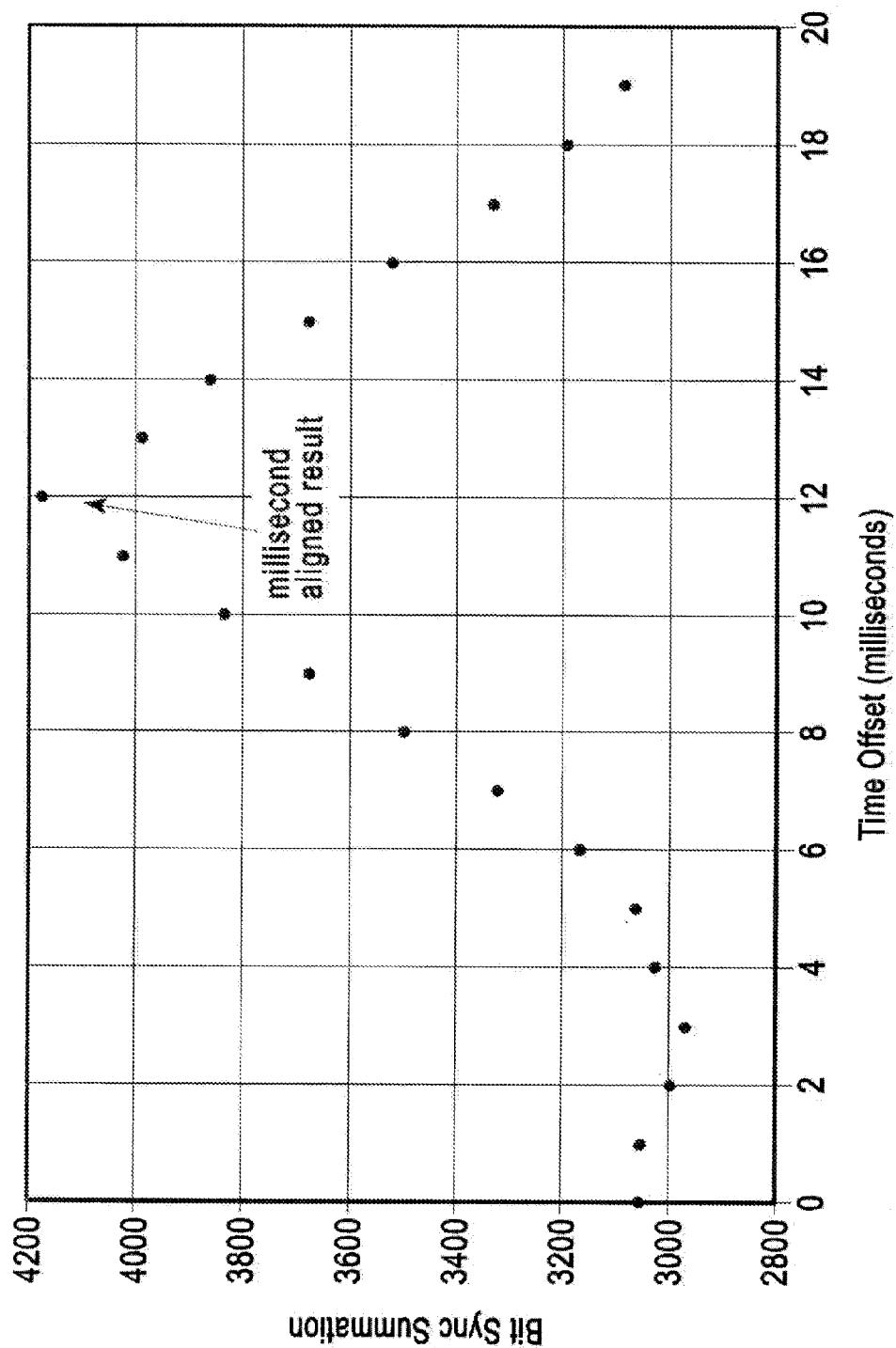
FIG. 6 illustrates an example of detecting a peak power value associated with a bit transition according to aspects of the invention.

FIG. 6 illustrates an example result of the overall bit sync summations (summing sqrt($I^2+Q^2$) over a number of bits, 200 bits in the case shown). An example implementation of the bit sync algorithm described in connection with FIG. 4 is to pick the 1 msec interval corresponding to the peak of FIG. 6, and compare its accumulated value to the predetermined threshold $P_{threshold}$. Additionally or alternatively, the ratio of the peak to the next peak can be checked, this effectively checks whether there have been enough data transitions (if no data transitions have occurred FIG. 6 would be flat across 0 . . . 19)

Returning to FIG. 4, if synchronization has not been achieved, processing for the next 20 msec period continues in step S414 until the predetermined threshold has been exceeded.

Returning to FIG. 3, and as discussed above, when weak data bit sync has been detected by module 304, this is reported to bit sync detector 306, which provides a signal to downstream processing regarding the weak data bit sync (i.e. high Pfa data bit sync). Meanwhile, further processing can be performed by the per-SV bit sync modules 302 until they respectively determine a data bit sync for the individual SV signals with a lower Pfa (e.g. <$10^4$).

Although there is always some probability of bit sync error after the weak data bit sync, in this case bit sync error causes ≈3×N meters of position error (where N=1 . . . 10), maximum error around 30 meters due to satellite motion, as described above.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for synchronizing to one or more signals in a positioning system, the method comprising:
   determining if sufficient a priori information on time or position associated with the signals is known;
   setting a target probability of false alarm (Pfa) to a first value if the a priori information is determined to be not sufficient and setting the target Pfa to a second value that is less strict than the first value if the a priori information is determined to be sufficient;
   setting thresholds for determining if data bit synchronization has been achieved in accordance with the target Pfa that has been set based on the determination of the a priori information; and
   performing, by a positioning device having a receiver for receiving the signals, data bit synchronization using the signals and the thresholds that have been set in accordance with the target Pfa.

2. A method according to claim 1, wherein performing data bit synchronization includes:
   accumulating respective first power values at a plurality of time offsets for a first one of the signals;

accumulating respective second power values at the plurality of time offsets for a second one of the signals;
time aligning the first and second signals;
combining the accumulated first and second power values at the plurality of time offsets after time alignment;
identifying a peak combined power value at one of the plurality of time offsets; and
determining whether the peak combined power value corresponds to successful synchronization based on the thresholds that have been set in accordance with the target Pfa.

3. A method according to claim 2, wherein the plurality of time offsets are twenty 1 msec intervals corresponding to a 20 msec data bit interval in a GPS signal.

4. A method according to claim 2, wherein the first and second power values correspond to combined I and Q values derived from the first and second signals, respectively.

5. A method according to claim 2, wherein the step of time aligning includes:
determining a difference in respective travel times of the first and second signals;
aligning the plurality of time offsets for the first and second signals based on the determined difference.

6. A method according to claim 2, wherein the step of time aligning includes:
obtaining an estimated position of respective transmitters of the first and second signals;
obtaining an estimated position of a common receiver of the first and second signals;
determining a difference in respective travel times of the first and second signals based on the obtained estimated positions;
aligning the plurality of time offsets for the first and second signals based on the determined difference.

7. A method according to claim 6, wherein the estimated positions are obtained from a network.

8. A method according to claim 6, wherein the respective transmitters are borne by respective satellite vehicles.

9. A method according to claim 2, further comprising:
identifying a signal quality of the one or more signals;
selecting the first and second signals from among the signals based on the identified signal quality before the combining step.

10. A method according to claim 1, wherein the step of determining if sufficient a priori information on time or position associated with the signals is known includes:
determining whether one or both of an unknown time offset between satellites associated with the signals and an unknown position of a receiver of the signals are within time and position uncertainty thresholds.

11. A method according to claim 10, wherein the time uncertainty threshold is half a modulo one millisecond uncertainty and the position uncertainty threshold is 150 km.

12. A method for synchronizing to one or more signals in a positioning system, the method comprising:
receiving an estimated position information and an estimated time;
determining if the estimated position information and the estimated time are within respective position and time uncertainty ranges;
setting a target probability of false alarm (Pfa) to a first value if the estimated position information and the estimated time are determined to be not within the respective uncertainty ranges and setting the target Pfa to a second value that is less strict than the first value if the estimated position information and the estimated time are determined to be not within the respective uncertainty ranges;
setting thresholds for determining if data bit synchronization has been achieved in accordance with the target Pfa that has been set based on the determination of the estimated position information and the estimated time; and
performing, by a positioning device having a receiver for receiving the signals, data bit synchronization using the signals and the thresholds that have been set in accordance with the target Pfa.

13. A method according to claim 12, wherein performing data bit synchronization includes:
accumulating respective power values at a plurality of time offsets for two or more of the signals using the received estimated position information and the estimated time;
identifying a peak power value at one of the plurality of time offsets; and
determining whether the peak power value corresponds to successful synchronization based on the thresholds that have been set in accordance with the target Pfa.

14. A method according to claim 13, wherein the plurality of time offsets are twenty 1 msec intervals corresponding to a 20 msec data bit interval in a GPS signal.

15. A method according to claim 13, wherein power values correspond to combined I and Q values derived from the signals.

16. A method according to claim 13, wherein the signals include first and second signals, the method further comprising:
determining a difference in respective travel times of the first and second signals from respective transmitters of the first and second signals to a common receiver of the first and second signals;
aligning the plurality of time offsets for the first and second signals based on the determined difference.

17. A method according to claim 13, wherein the signals include first and second signals, the method further comprising:
obtaining an estimated position of respective transmitters of the first and second signals from the estimated position information;
obtaining an estimated position of a common receiver of the first and second signals from the estimated position information;
determining a difference in respective travel times of the first and second signals based on the obtained estimated positions;
aligning the plurality of time offsets for the first and second signals based on the determined difference.

18. A method according to claim 17, wherein the estimated positions are obtained from a network.

19. A method according to claim 17, wherein the estimated positions are obtained from stored information that is retrieved in a hot start of the common receiver.

20. A method according to claim 12, wherein the time uncertainty is half a modulo one millisecond uncertainty and the position uncertainty is 150 km.

21. A method according to claim 2, wherein the first and second signals are respectively transmitted by first and second different transmitters in the positioning system.

22. A method according to claim 13, wherein the first and second signals are respectively transmitted by first and second different transmitters in the positioning system.

* * * * *

UNITED STATES PATENT AND TRADEMARK OFFICE
CERTIFICATE OF CORRECTION

PATENT NO. : 8,970,431 B2  
APPLICATION NO. : 13/478077  
DATED : March 3, 2015  
INVENTOR(S) : Lennen Page 1 of 1

It is certified that error appears in the above-identified patent and that said Letters Patent is hereby corrected as shown below:

In the specification

In Column 5, Line 26, delete "receiver 112" and insert -- receiver 122 --, therefor.

In Column 5, Lines 27-28, delete "receiver 112" and insert -- receiver 122 --, therefor.

In Column 5, Line 30, delete "receiver 112" and insert -- receiver 122 --, therefor.

In Column 10, Line 33, delete "(e.g. $<10^4$)." and insert -- (e.g. $<10^{-4}$). --, therefor.

Signed and Sealed this  
Third Day of November, 2015

Michelle K. Lee  
*Director of the United States Patent and Trademark Office*